United States Patent [19]

James et al.

[11] Patent Number: 5,473,332

[45] Date of Patent: Dec. 5, 1995

[54] RFI SUPPRESSION CIRCUIT AND METHOD

[75] Inventors: Jesse C. James, Huntsville; James B. Blackmon, Jr., Brownsboro, both of Ala.

[73] Assignee: McDonnell Douglas Corporation, St. Louis, Mo.

[21] Appl. No.: 288,373

[22] Filed: Aug. 10, 1994

[51] Int. Cl.⁶ .................................................. G01S 13/524
[52] U.S. Cl. .......................... 342/159; 342/101; 342/102; 342/192; 342/99
[58] Field of Search .................................... 342/159, 160, 342/162, 98, 193, 101, 161, 99, 192, 102, 103, 39, 379

[56] References Cited

U.S. PATENT DOCUMENTS

| | | | |
|---|---|---|---|
| 3,603,996 | 9/1971 | Murchison et al. | 342/28 |
| 3,879,729 | 4/1975 | Nevin | 342/161 |
| 3,962,704 | 6/1976 | Evans | 342/162 |
| 4,062,011 | 12/1977 | Preston et al. | 342/94 |
| 4,122,448 | 10/1978 | Martin | 342/174 |
| 4,146,889 | 3/1979 | Brennan et al. | 342/81 |
| 4,153,899 | 5/1979 | Taylor, Jr. | 342/162 |
| 4,617,570 | 10/1986 | Gutleber | 342/429 |
| 4,622,552 | 11/1986 | Andrews et al. | 342/196 |
| 5,162,805 | 11/1992 | Cantrell | 342/379 |
| 5,212,490 | 5/1993 | Nelson et al. | 342/111 X |

*Primary Examiner*—John B. Sotomayor
*Attorney, Agent, or Firm*—Ronald M. Goldman; Roger C. Turner

[57] ABSTRACT

Improvement of radar sign-to-noise ratio and detection sensitivity in radar systems is achieved by methods employing the subtraction of the unwanted radio frequency interference, RFI, or "clone" signals thereof, from the total received signal. The Clone signals are appropriately adjusted in phase and amplitude, and are obtained from an auxiliary broad beam antenna or from a delayed sample from the system's principal antenna. When multiple RFI signals at different frequencies are present, the entire receive band is subdivided into a plurality of frequency sub-ranges.

26 Claims, 4 Drawing Sheets

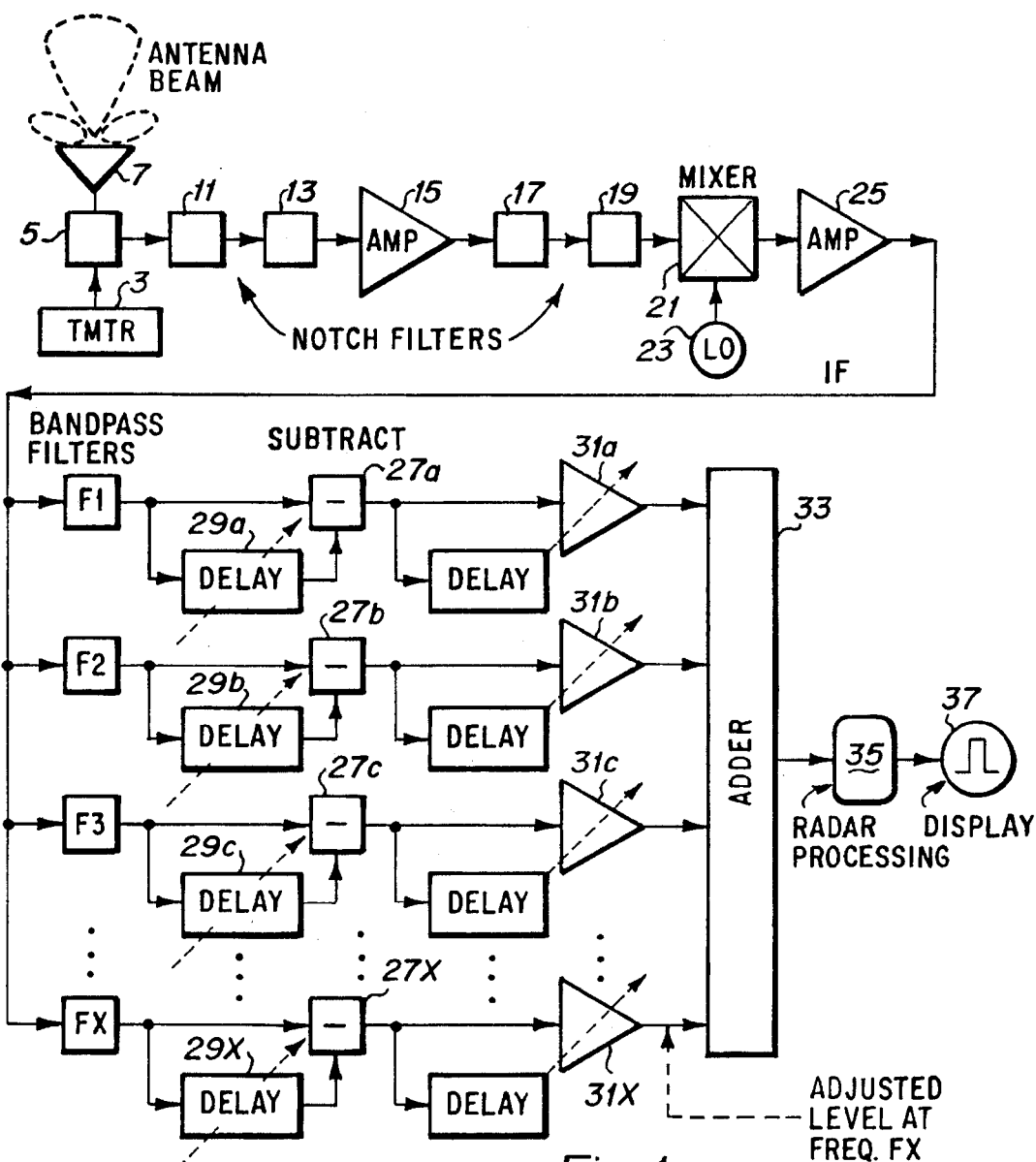
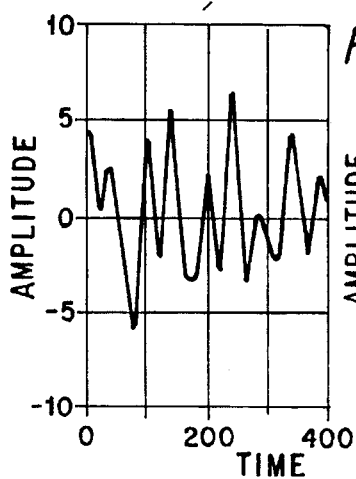
Fig_2A
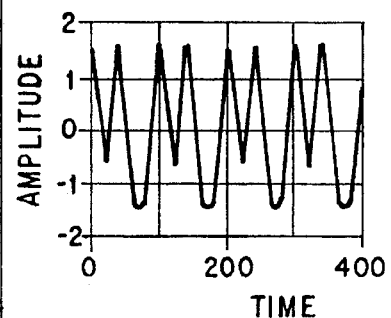
Fig_2B
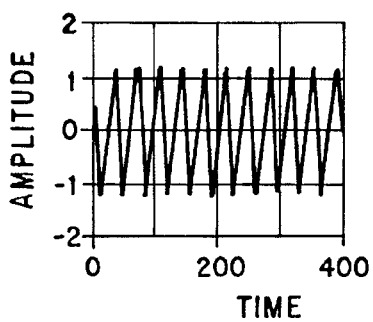
Fig_2C

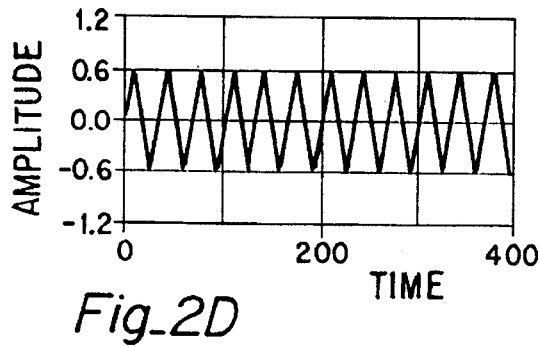
Fig_2D
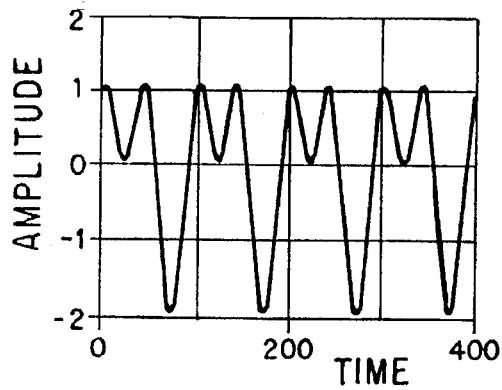
Fig_2E
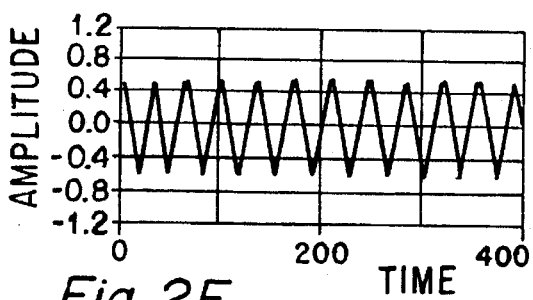
Fig_2F
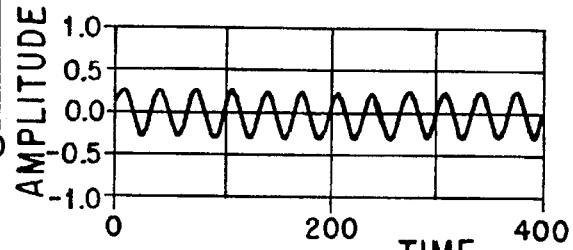
Fig_2G
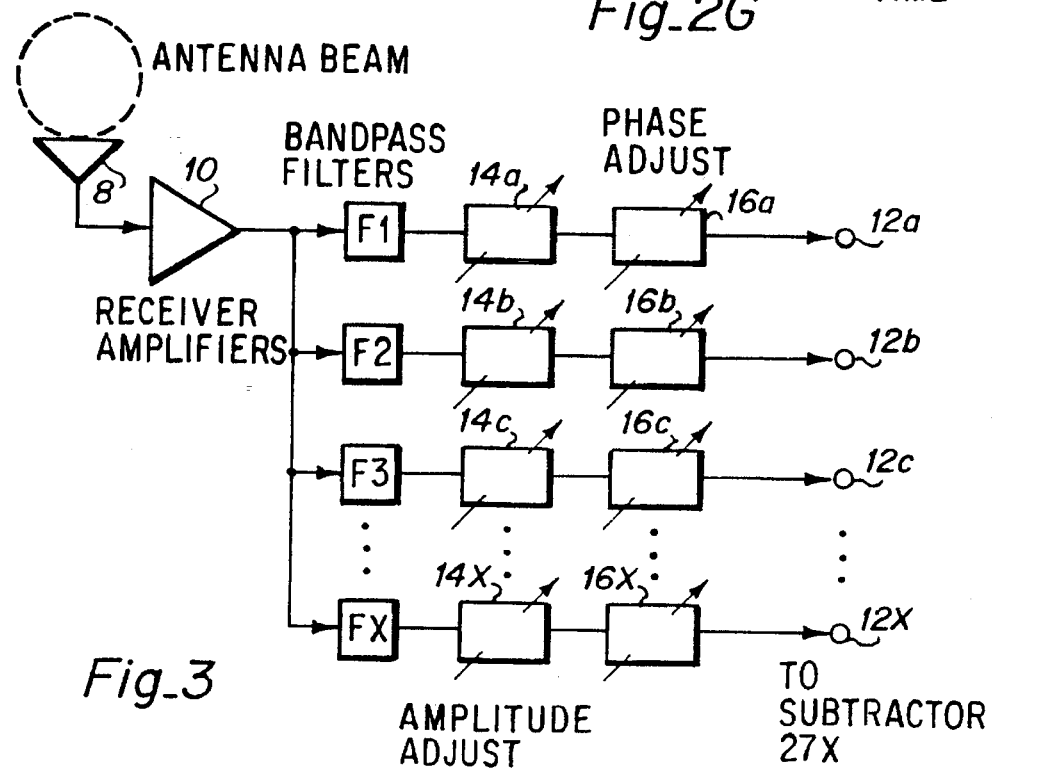
Fig_3

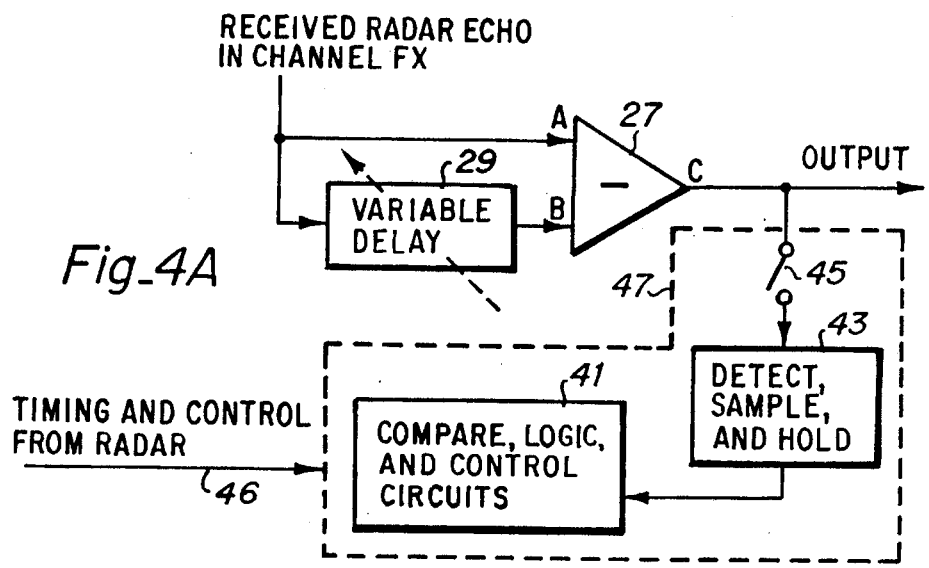
Fig_4A
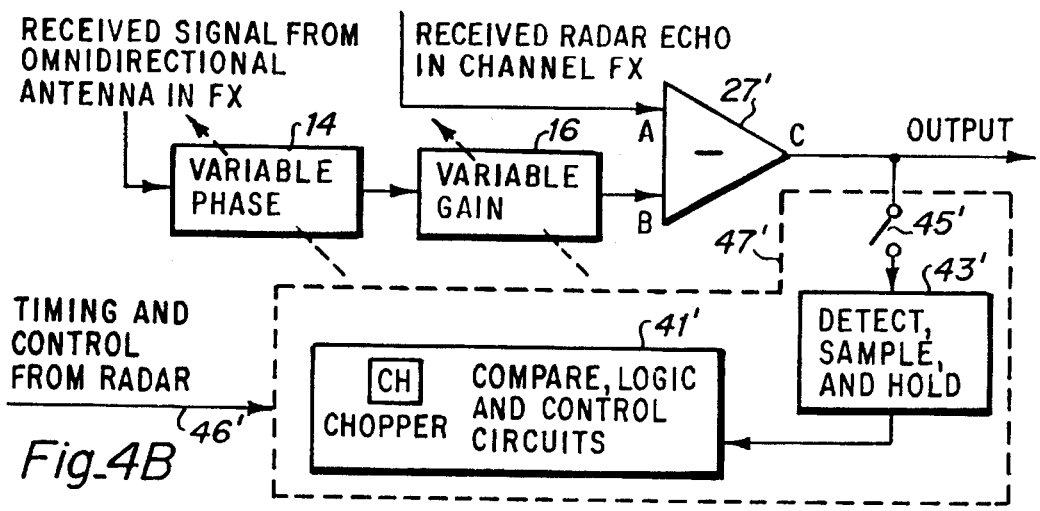
Fig_4B
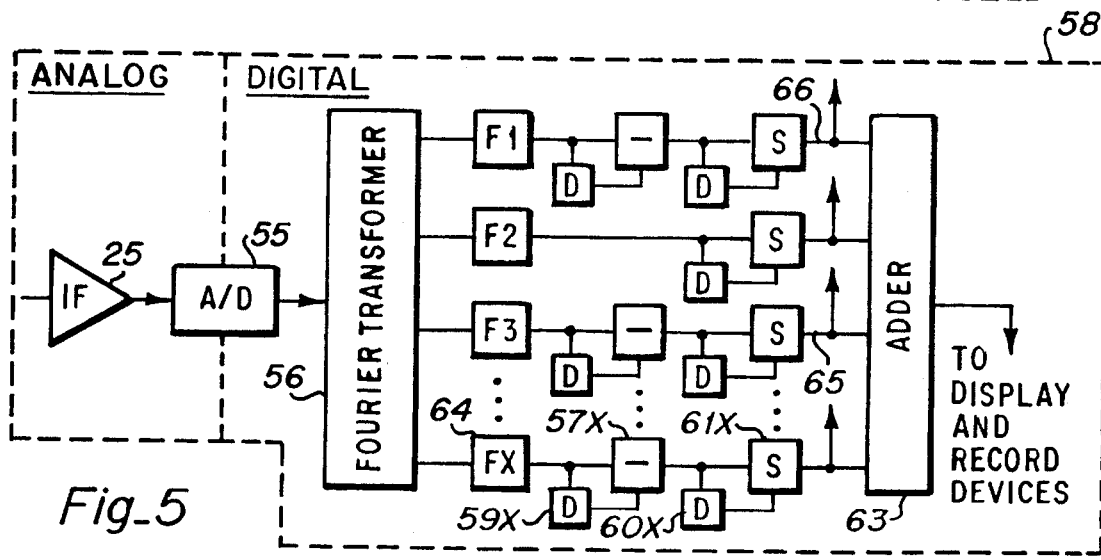
Fig_5

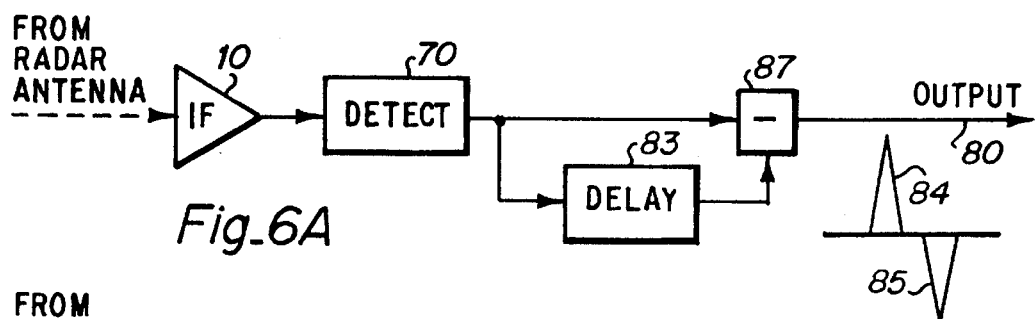
Fig_6A
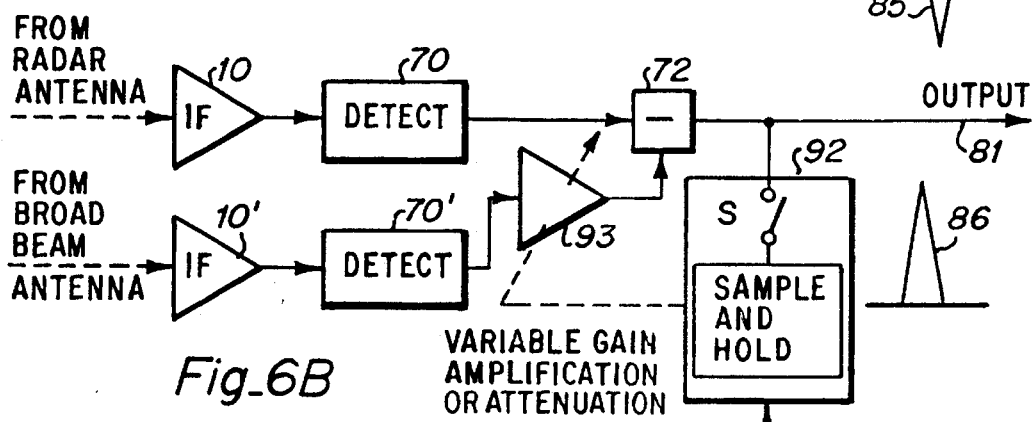
Fig_6B
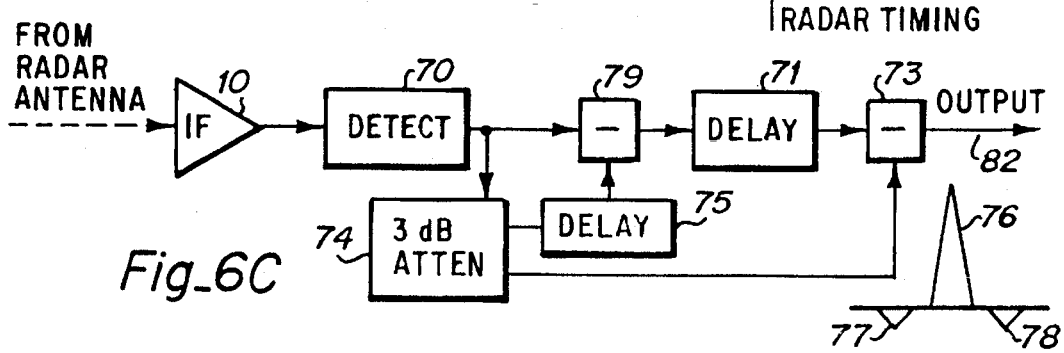
Fig_6C
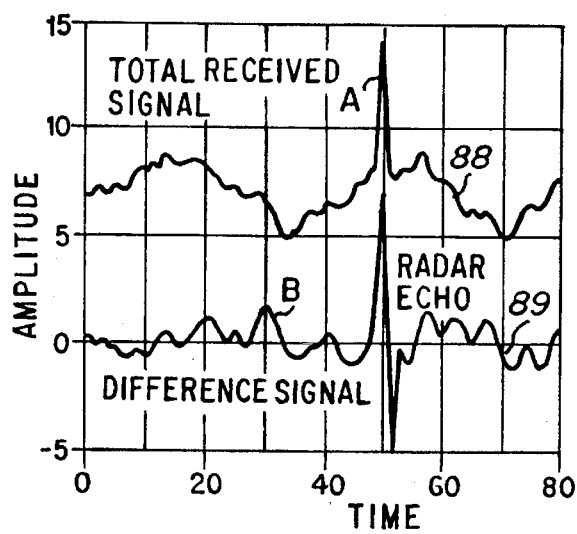
Fig_7A
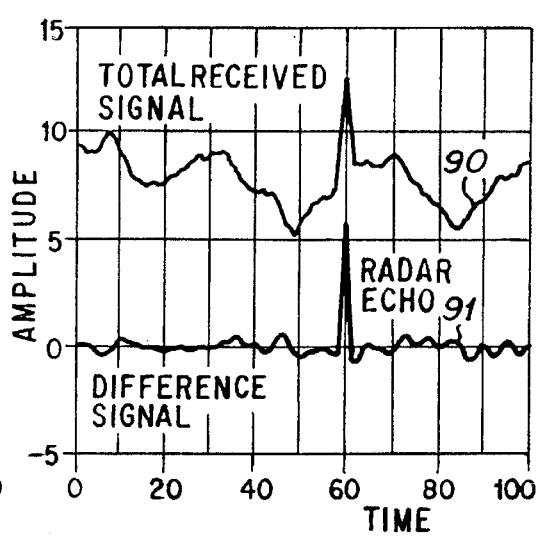
Fig_7B

RFI SUPPRESSION CIRCUIT AND METHOD

FIELD OF THE INVENTION

This invention relates to suppression of radio frequency interference in wideband radar and radio communication receivers and, more particularly, to a novel method and means to reliably operate pulse radar and communications systems in the presence of multiple sources of interference signals.

BACKGROUND

The continuing proliferation of radio frequency sources operating in an ever more congested radio frequency spectrum creates increasing interference to radar system operation. In a sense, what constitutes music to the ears of those operating the other radio frequency sources is noise to one's own system, radio frequency noise, or, simply, RFI. At times the RFI level is so great that it completely obscures or masks the radar echoes produced by one's radar system and reduces the radar system's ability to detect the desired echo signal from amongst the background signals or clutter, effectively reducing radar system sensitivity.

The interfering RF signals which the present invention addresses are principally narrow band, operating essentially at one frequency, either intermittently or continuously, as example, the higher harmonics of a shortwave broadcast station or a police radar, but also encompasses RFI over a band of frequencies, as example, produced by a television station. Although the RFI energy can be very low and might be disregarded in many instances, for radar systems, RFI cannot be disregarded, since radar echoes often are very low in power level. That is especially so when the echoing surface employs modern radar suppression technologies, "stealth" to reduce radar cross section and reflected signal strength.

Wideband radar systems generate pulses of microwave energy, having very short rise and fall times, or square pulse, as variously termed, and look for return of an echo, the signal reflected from a surface. The amplitude of the echo signal may vary from large to very small, depending upon the distance the echo signal travels from a reflecting object and the reflectivity characteristic of that object. To ensure accurate display of that wideband echo, faithfully reproducing the pulse shape, the systems radar receiver, hence, must have a wide band characteristic at least equal to that of the transmitted pulse.

Advanced pulse communications systems may also be wide band in nature. While the station to station distance is usually known in communication systems, the range of those stations, that is, the distance between the communications stations, can be increased, assuming the power level remains fixed, by reducing RF interference.

Such radio frequency interference is not new. Elimination of the adverse effect of RFI in a radar receiver has typically been accomplished by incorporation of notch filters in the receiver. The notch filter is a radio frequency filter that has a sharply defined frequency characteristic that is tuned to the frequency of the offending RFI source. It selects and effectively blocks passage of the RFI through the receiver's amplifier sections. An adverse side effect is that the notch filter also consumes or dissipates a portion of the desired signal's power, effectively reducing receiver sensitivity. Since the notch filter remains permanently in the circuit, the side effect continues, irrespective of whether the offending station is on the air or not.

In modern times many interfering RF sources are present at different frequencies, requiring a corresponding number of notch filters in the receiving system. The notch filter's side effect of dissipating a portion of the desired signal is unfortunately cumulative. As new sources of RFI present themselves, then additional notch filters must be incorporated into the receiver system to block out such added RFI sources. To construct and install those filters is a time consuming and costly task, in addition to the consequent loss of signal strength caused to the desired signal.

Minimization of RFI is also achieved by use of directional antennas. Radar antennas are designed to be highly directional. That directivity minimizes reception of RFI as may propagate to the antenna from other directions, astride the antenna's axis. Nonetheless even such highly directional antennas contain off directional areas of sensitivity, commonly referred to as side lobes. And offending levels of RFI can be received though such side lobes. While side lobes can be minimized it is not possible to eliminate them entirely.

Accordingly, an object of the present invention is to minimize RF interference in radar and other receivers.

Another object is to remove the unwanted interfering RFI produced by all stations transmitting at any given time, without removing a significant amount of the RF signal that one desires to receive.

SUMMARY OF THE INVENTION

The present invention relies upon the principles of signal cancellation. In the present invention, the amplitude and phase of each interfering signal, the RFI, is measured and a like signal of equal amplitude and phase is subtracted from the interfering signal to effectively cancel the latter signal. When the radar echo has a wide band characteristic and is short in duration, and the RFI is narrow band and thus longer in duration, a sample of the RFI is delayed the proper amount and is then subtracted from the total signal. When the RFI and echo do not meet the foregoing conditions an alternate technique is employed. In the latter a separate broad band omnidirectional antenna is used to receive the RFI, simultaneously with the principal antenna's reception of both the radar echo and the RFI. The omnidirectional antenna characteristically is relatively insensitive to the radar echo. The RFI signal received via the one antenna is essentially subtracted from the other, reducing the RFI. The echo, which is the desired signal, passes through the filtering and subtraction circuits with only minor modification.

More specifically, received RF signals within the receiver's wide band frequency range, that include the persistent interfering RFI, are separated into a plurality of frequency sub-ranges with each spurious signal, preferably, falling into a respective sub-range; a clone signal, derived from the RFI that is delayed the appropriate amount, is obtained for each spurious frequency signal that is essentially equal in amplitude and phase with the amplitude and phase of the associated spurious signal within each respective subrange; the spurious and clone signals are combined to produce corresponding difference signals, effectively cancelling corresponding spurious signals, leaving primarily components of the desired radar echo; and the difference signals are recombined to form a composite signal in which any interference signals have been minimized, whereby the combined signal represents essentially only the desired radar echo.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 illustrates in block diagram and schematic form a radar system containing an embodiment of the RFI elimination circuitry of the invention;

FIGS. 2a through 2g shows exemplary signal wave shapes that are helpful to an understanding of the operation of the invention;

FIG. 3 shows a second alternative embodiment of the RFI elimination circuits that employs a separate broad beam antenna;

FIG. 4a shows a block diagram of a feedback control circuit for automatically adjusting the phase of the subtracting signal inputted to the subtract input of the subtract circuit in the embodiment of FIG. 1;

FIG. 4b shows a block diagram of a feedback control circuit for automatically adjusting the phase and gain of the subtracting signal inputted to the subtract input of the subtract circuit in the embodiment of FIG. 3;

FIG. 5 is a block diagram of an alternate embodiment of the invention that employs a digital signal processor;

FIGS. 6A, 6B and 6C illustrate another embodiment in which the RFI elimination is made to the detected signals, instead of at the IF stages as in the embodiment of FIG. 1; and FIGS. 7a and 7b illustrate the effect of amplitude subtraction of signals in the embodiment of FIG. 6 when the bandwidth of RFI is only slightly smaller than that of the radar echo.

DETAILED DESCRIPTION OF THE PREFERRED EMBODIMENTS

Reference is made to FIG. 1 which partially illustrates a radar system containing the invention in block diagram form. This includes a transmitter 3, TR switch 5, a highly directional antenna 7, and a wideband receiver, the elements located to the right of TR switch 5. The receiver includes serially connected notch filters 11 and 13, low noise RF wide band amplifier 15, sometimes referred to as the front end tuner, which amplifies inputted RF signals, additional serially connected notch filters, 17 and 19, the downconverter circuits, including mixer 21 and local oscillator 23, which converts the RF signal to the lower intermediate frequencies (IF), and IF amplifier 25, which amplifies the IF signals. The foregoing elements and their assembly are all conventional in radar systems.

Antenna 7 serves to transmit each pulse of RF generated by transmitter 3, while TR switch 5 blocks that high power pulse from entering receiver 9. In the interpulse period, the antenna receives any echoes of the transmitted pulse as may be reflected by a reflective object, such as an aircraft. The antenna also picks up RF generated at various frequencies by extraneous sources as may be present, the RFI. Though the antenna is highly directional and thereby minimizes picking up such interference, such antennas typically contain side lobes having lesser sensitivity than the lobe representing the antenna's principal direction, as represented by the dotted pattern in FIG. 1. Thus some RFI may also be picked up by the antenna through those side lobes.

Both the radar echo, which may be received for short pulse periods, should a reflecting object be present, and the RFI, which generally persists, are processed in the radar receiver in the customary manner. The RF signals are filtered, amplified, filtered again and inputted to mixer 21, which downconverts that RF to a lower intermediate frequency range, IF, that is outputted from IF amplifier 25. The foregoing is the conventional mode of operation of the radar receiver.

Although a purpose of the invention is to minimize or eliminate use of notch filters, in the practical world some notch filters may be required, and, hence, such notch filters are included in the principal embodiment of the invention. Strong and persistent sources of RFI are notch filtered. These notch filters are represented by 11, 13, 17, and 19 in FIG. 1, even though none may be needed. Filters 11 and 13 are for the very strong RFI signals, and these filters are placed before the first amplifier because of the possibility of producing intermodulation frequency components in the first amplifier. RFI signals that are strong, but not very strong, are filtered by notch filters 17 and 19. An attempt should be made to locate the radar where there are no strong RFI signals, but since this is not always practical, and in some case strong RFI can be used as a countermeasure, the principles presented are of particular benefit to both commercial and defense applications.

The IF output of amplifier 25 is connected to a frequency range separator formed by a plurality of bandpass filters F1, F2, F3, . . . and Fx, wherein the output may be divided or parsed into component frequencies. Each of the band pass filters covers a range of frequencies, defining a frequency channel, and that range differs from the range of frequencies covered by any of the other corresponding band pass filters. In total the bandpass filters and the channels thereby defined complement one another and collectively cover the entire bandwidth or frequency range designed for the radar receiver.

The exact number of bandpass filters used is chosen in accordance with the principles described hereafter and depends on how finely one desires to divide up the frequency spectrum. Preferably, each channel should include only one of the interference frequencies as a design goal, although not absolutely necessary. Further the channels need not be of the same increment of frequency range. Thus if some interference sources are close to one another in frequency, while still another source of interference is widely separated in frequency from the foregoing, the frequency spectrum may be divided into small portions to compartmentalize the first sources, while the latter interference source may occupy a large portion that is of a wide frequency range. By the foregoing means, the signals output from the IF amplifier are parsed or compartmentalized into discrete frequency channels defining multiple outputs.

The multiple outputs resulting from the frequency separation are applied to corresponding inputs of subtraction circuits, 27a, b, c . . . x, each of which is associated with an output of a respective bandpass circuit. The output of band pass filter F1 is connected to an input of a subtract circuit 27a; that of F2 is connected to subtract circuit 27b; and so on, as illustrated, through band pass filter Fx connected to subtract circuit 27x. Each of the subtract circuits contains a second input to supply the respective subtracting signals.

Considering the channel defined by bandpass filter Fx, in this embodiment a delay circuit 29x is connected between the output of filter Fx and the second input to subtract circuit 27x, whereby, such clone signal, a delayed replica of the signal received by the radar found in the associated channel, just prior to the arrival of the echo of the signal, is applied to the second input of subtract circuit 27x. And a difference signal is output from the subtract circuit.

After being delayed by delay circuit 29, the clone signal is of nearly the same amplitude and phase as the echo signal in the respective channel. Delay circuit 29x is formed of a conventional phase shifter which both delays and shifts the phase of the input signal by the appropriate number of degrees. A delay circuit in effect stores a signal for a time, and this causes a phase shift which can be quite large compared to 360 degrees. A phase shifter can be simply a short delay circuit, or it can be a circuit that changes the phase while causing very little delay. The phase shifter is adjustable, as indicated, and allows the amount of phase shift to be manually or automatically varied. The delay may be divided into two parts, a fixed gross delay and a small variable delay. The gross delay is manually set to be approximately equal to the radar pulse length plus the expected target length. The small variable delay is a conventional phase shifting circuit, referred to as a phase shifter, with a range of 360 degrees at the intermediate frequency (IF). Ideally the difference signal outputted from the subtract circuit should be zero during the period in which no echoes are being received.

Like clone or replica signals to that discussed in connection with band pass filter Fx are formed in each of the other channels; that associated with bandpass filter F1 by adjustable phase shifter 29a, that with filter F2 by adjustable phase shifter 29b, and so on, and the associated subtractor circuits, 27a, 27b and the like, outputs the respective difference signals.

As those skilled in the art appreciate, and putting aside consideration of the succeeding amplifier 31 and adder 33 elements illustrated in the figure, were one to combine the outputs of the subtractor circuits for the individual channels, in the absence of a received radar echo, the combined signal should be minimal, since all of the RFI has been cancelled out. However, during the presence of the radar echo, those outputs should combine to reproduce that echo.

Radar waveforms and hence radar echoes may be of varying bandwidths ranging typically from 1 KHz to 1000 MHz. The range resolution is inversely related to the bandwidth. And the probability of RFI increases with bandwidth. The waveform bandwidth must be encompassed by the range of frequency channels indicated by F1 through Fx in FIG. 1. When the echo is processed by the receiver, the path taken by the echo will include as many of the frequency channels as needed. In each of the channels, the RFI occurring in that channel is subtracted from the signal formed of the RFI and the part of the echo occurring in that channel.

It may be noted that, theoretically, the RFI could possibly change over the delay period, and the radio transmitter causing the RFI could even turn off. In practice, a significant variation in the RFI amplitude is unlikely, because the delay period is very short, of the order of 1 to 100 microseconds and is of the same order of duration as that of the radar pulse, and the bandwidth of the RFI is small. The decay time of the RFI is the reciprocal of the bandwidth.

It is also noted that the second embodiment, described later in this specification, obtains the second or subtracting signal applied to the second input of the subtractor circuits, not from the respective channels, but from a second antenna that is broadband and omnidirectional in characteristic, and thereby purposefully acquires large levels of RFI for use in making the subtraction from that in the principal channels. In that second embodiment it is not necessary for the RFI to be greater in duration than the echo pulse.

Subtract circuits 27 are preferably formed of conventional differential amplifiers, which is basic to the subtraction scheme. The differential amplifier's output is the difference of the two inputs. This difference signal is also amplified a given amount by the differential amplifier, but such amplification is not of great importance to the present application and is only incidental. Such amplifiers are highly developed and are available in many forms, including the form of small plug-in semiconductor chips. And while the foregoing subtract circuit employs a differential amplifier to make the subtraction, equivalent circuits may be used. As example an adder may be substituted in which case the two input signals should be of the same amplitude and one hundred and eighty degrees out of phase, whereby the adder effectively subtracts the two signals.

The multiple difference signals obtained from the subtractor circuits are each amplified by the respective associated amplifiers 31a, 31b, . . . 31x, which are gain controlled amplifiers discussed in greater detail hereafter, and are recombined into a single signal by a conventional adder circuit 33. The gain of each amplifier depends upon the RFI, or noise, that leaked through the previous circuits and appears at the input to the respective amplifier. The gain of each amplifier decreases when the RFI noise at its input increases.

Adder 33, which may be called a combiner, is of known design and may be formed of a simple resistive lattice. The adder recombines the various spectral components of the signal forming the radar echo, as was parsed between the various channels earlier, and now separately applied to the adder's multiple inputs, into a single broadband corrected signal, thereby reproducing the radar echo. The outputs of each of the amplifiers 31 is connected to a respective one of the adder's multiple inputs. The output of the adder, representing a composite of the signals applied at its input, is then applied to the remaining receiver circuits, generally indicated by block 35, and, ultimately, the corrected signal is displayed on a display device 37, such as a cathode ray tube, presenting the radar echo substantially with little or no presentation of the RFI.

The Amplifiers 31, that precede the adder, have gains controlled by the noise and RFI levels in the respective channels. The gain of each amplifier depends upon the RFI, or noise, that leaked through the previous circuits and appears at the input to the respective amplifier. The RFI that leaked through might be due to a new broadband interfering station or the failure of one of the difference amplifiers. This possibility must be guarded against, and that is served by variable gain amplifiers 31a through 31x. The gain of each of these amplifiers is set to be inversely proportional to the square of the RFI and noise power present at its input with adjustments for bandwidth. The design of such amplifiers is known, and need not be described here in detail.

The purpose of the delay circuit associated with each of amplifiers 31 is to provide a sample of the average noise-plus-RFI level when an echo signal is not present. When all preceding circuits perform as designed and when there are no new interfering stations, the amplifiers 31 are not needed. These amplifiers in effect weigh the individual contributions to the total signal sum presented on the output device 37. For example, when a new interfering station appears and the RFI leaks through the previous circuits, the amplifier 31 in that channel will have a low gain so that the effect of the new station is minimal.

After all receiving channels have been corrected with the RFI subtractions, each channel is amplified by amplifiers 31 and the outputs of those amplifiers are then recombined at Adder 33, which outputs the corrected signal.

It is noted that any radar echo received during this period is, like the RFI, also divided into its various spectral components and parsed amongst the separate channels and those spectral components are also fed into the delay circuit through which the subtracting clone signal is formed, along with any RFI. However, in being delayed, by the time the spectral component is subtracted, the component of that echo that was not delayed will have already passed through the subtract circuit to the succeeding circuits. In this case a double echo at IF will output from the subtract circuit. These two echoes will be delayed in time by the delay time of delay circuit 29, and the second echo will be out of phase with the first. Normally, the second echo will be expected by the operator and is either deleted out of the signal path by a gate circuit, not illustrated, or is ignored.

To illustrate the effect of the variable gain amplifier 31, a hypothetical case involving three channels of RF is shown in the seven plots of FIG. 2. These plots are short-time snapshots of the signals at IF at various points in the circuit.

The waveforms presented in FIG. 2 illustrate the effects of the difference circuit 27 and the variable gain amplifier 31 of FIG. 1 and the result expected from the operation of an embodiment that includes only three frequency channels, F1, F2, and F3, amongst which to parse the signal. The radar echo is in these three channels, along with an RFI signal in each channel. The curve in FIG. 2a is the total signal received including echo plus RFI as appears at the output of IF amplifier 25. Note the amplitude scale. All scales in FIG. 2 are proportional to volts and are mutually consistent.

FIG. 2b shows the echo signal, only, at the output of the adder, 33, and after the subtractor circuits 27a, 27b, and 27c have removed the RFI in accordance with the invention.

FIGS. 2c and 2d show the RFI and the echo component, respectively, in channel F3 before application to associated subtractor circuit 27c.

In particular in this example, it is assumed that difference circuit 27c fails to subtract the delayed signal for some reason. In this case the gain of amplifier 31c is decreased a certain amount to increase the optimum signal to noise ratio at the output of the adder. This hypothetical example is described in the following paragraphs.

FIG. 2e shows the sum of the echoes, only, in channels F1 and F2. This represents the output of adder 33, less some residual noise, when channel F3 is disconnected. FIGS. 2f and 2g show the RFI and the echo component, respectively, in channel F3 at the output of amplifier 31c when subtractor 27c fails to function for some reason or when delay 29c is disconnected. These two figures should be compared with FIGS. 2c and 2d to see the effect of the variable gain circuit 31c. The gain of amplifier 31c in this situation is controlled by the level of RFI signal shown in FIG. 2c. In this hypothetical case, when the RFI in channel F3 was not removed by the associated subtractor circuit, the output of the adder would be the sum of the signals in FIGS. 2e, 2f, and 2g, and the signal-to-noise power ratio would be 6.2, which is optimum for this case.

Reference is made to FIG. 3, which illustrates in block diagram form an alternative means by which to form the separate clone signals as a substitute for delay circuits 29a through 29x in FIG. 1. In this alternative, a receiving antenna that is essentially omnidirectional in its reception characteristic receives RF that propagates to the antenna from virtually any direction, as represented by the circular pattern in dash lines, and applies the RF to Receiver 10. In turn the receiver outputs the amplified and heterodyned signal which is applied to the inputs of the various bandpass filters F1, F2, F3 . . . Fx as in the preceding embodiment, which divides the frequency spectrum constituting that signal into various channels. Incoming signals received by the omnidirectional antenna are thus parsed into the appropriate frequency channel F1 throught Fx.

A line length adjust $16x$ and an amplitude adjust circuit $14x$ are connected in series between the output of bandpass filter Fx and output $12x$; like line length adjust circuits and amplitude adjust circuits $14a$ and $16a$, $14b$ and $16b$, and so on are connected in series between the respective bandpass filters and the associated one of the outputs $12a$, $12b$ and so on.

To complete the embodiment, the foregoing elements are connected to the subtractor circuits of FIG. 1 to which reference is again made. Delay circuits $29a$ through $29x$, in the preceding embodiment are deleted from the system. In their place the respective outputs of the circuit of FIG. 3 are substituted, with each of the outputs $12a$, $12b$, . . . $12x$ being connected to the second or subtracting input of a respective one of the subtractor circuits $27a$, $27b$ . . . $27x$. That completes the second embodiment.

In such an arrangement the RF interference is incident not only on directional antenna 7, but on omnidirectional antenna 8 as well, perhaps slightly displaced in phase depending on the relative location of the two antennas. The directional antenna 7 and the omnidirectional antenna 8 should be physically near each other to minimize the phase differences in each common RFI signal. For example, the omnidirectional antenna can be just one element of a phased array, or it can be a small omnidirectional antenna attached to a directional parabolic antenna that rotates. By mounting the secondary antenna on or very near the principal antenna, the phase difference between the two antennas is minimized.

In practice, the main concern is with any RFI that is picked up in the main and side lobes of the principal radar antenna; however, the means of FIG. 1 should be used when RFI is present in the main lobe. RFI signal strength at large off-axis directions of the principal antenna is typically relatively low.

When the alternative means of FIG. 3 is used to generate the RFI signals for subtraction, each frequency channel should contain no more than one RFI signal. The reason for such condition is that a different delay is needed for each direction of RFI arrival. With the embodiment of FIG. 1, it is possible to have only one frequency channel, though this is not optimum.

Amplitude adjust circuit $14x$ is a variable gain amplifier whose output level during interpulse intervals is made equal to the amplitude of the principal antenna input to the subtract circuit, so that the difference signal outputted by the subtract circuit during that interval is essentially zero. The line length adjust $16x$ performs a delay function similar to that of delay $29x$ used in FIG. 1, except that the gross delay produced is only sufficient to match the difference in the delay times of the two receiving systems. It accounts for the placement of the auxiliary antenna and for difference in delay caused by use of two separate receivers, whose characteristics may differ slightly from one another.

The omnidirectional antenna in this embodiment may also receive radar echoes, but the power level of those echoes is very low since the antenna is not designed for receiving those echoes. Thus in producing the clone signals of existing RFI, the radar echo strength is negligible and may be disregarded.

A specific form of adjustable subtract circuit as may be used in the embodiment of FIG. 1 is illustrated in FIG. 4a, the case when an auxiliary antenna is not required. A corresponding specific adjustable subtract circuit useful in the embodiment of FIG. 3 is illustrated in FIG. 4b, the case when an omnidirectional antenna is required in the RFI suppressor system. This adjustment circuit is a feedback circuit that causes the signal output at the output, C, of differential amplifier 27 to be a minimum at all times when a radar echo is not being received.

Referencing FIG. 4a, the subtract circuit formed of differential amplifier 27, having inputs A and B, the subtract input, and output C, and delay 29, which were earlier described, are illustrated. A timing and control line from the radar timing circuits controls the opening and closing of switch 45 and controls compare circuits 41. A sample and hold circuit 43 provides signals for circuit 41 which in turn controls the level of delay introduced by variable delay circuit 29. FIG. 4b includes the differential amplifier 27 and the variable phase circuit 14 and variable gain circuit 16, earlier described in connection with FIG. 3. For convenience the control elements appearing in FIG. 4b, are given the same denomination as used in FIG. 4a and are primed.

Sample-and-hold circuit 43, with an input time constant of 10 to 100 periods of the intermediate frequency, IF, samples the signal from the output, C, of differential amplifier 27. An incremental change in phase or amplitude is then made and an identical sample-and-hold circuit samples output C again. The two levels held by the sample-and-hold circuits are compared in a DC difference amplifier as forms part of the compare and logic circuits 41. Another incremental change is made in the direction to decrease the output C level, and this is determined by which of the two samples is larger. The first sample-and-hold circuit is dumped and another sample is taken and the process repeated. The sample-and-hold circuits, comparison circuits, the logic circuits, and phase and amplitude changing circuits are state of the art and require no further description.

The magnitude of the incremental change in phase or amplitude may be constant or variable. If constant, the magnitude should be small and reflect the error that can be tolerated in the subtraction circuit. If variable, the magnitude should be proportional to the difference in the two sampled levels, but should be no more than ten times the error that can be tolerated. The chopper, Ch, in FIG. 5b allots part of the time to the variable gain circuit and part of the time to the variable phase circuit, so that gain and phase adjustments are alternately adjusted for greater accuracy.

The variable circuits shown in FIGS. 4A and 4B are initially adjusted manually. Even in the best electronics, gain and delay changes occur with time. These changes are often due to temperature changes. When the RFI is from a transmitter on a vehicle or airplane the phase in the omnidirectional-antenna channel changes relative to that in the radar channel. For those reasons the variable gain and variable phase circuits in FIG. 4 are desirable. The feedback from output C of differential amplifier 27 controls the variable delay and variable gain circuits to force the output level at C to be a minimum. The resulting gains and phase shifts then are proper. Switch 45 is open only when the radar transmitter is transmitting or when a radar pulse is being received. This fraction of time is typically less than 10 percent of the total time. So for most of the time, the variable circuits are being adjusted.

In operation, a radar system's transmitter generates and radiates the radar pulse. After the lapse of a predetermined period thereafter, the radar system then gates its associated receiver to the "on" condition for another interval to listen for any radar echoes returned to the radar system during that interval, referred to as the "receive window". The receiver is then gated off as the system prepares to generate the next radar pulse. This sequence is repeated continuously. Modern radar systems are computer controlled and all such functions and intervals are controlled by the radar's computer.

The radar system's timing circuits provide a signal that is used to control feedback circuits 47 via lead 46. Included in the feedback circuits is switch 45, which is normally closed. Switch 45 is open during transmitter pulsing and for a short period thereafter. It is also open during the receive gate when the radar echo is expected. The receiver is on and connected to the antenna at all times, except during transmitter pulsing plus a settling time thereafter. When switch 45 is closed the feedback circuits are being adjusted. This cycle of transmitting, receiving, and feedback adjusting is repeated over and over as the radar searches and tracks.

While the foregoing circuit has been described in connection with a radar system, as those skilled in the art recognize, it may also be applied in a pulse communication system as well. In the case of a communications receiver, the adjustment circuit of FIG. 4 operates only at preselected times. The frequency of operation of the feedback adjustment circuit for communication receivers depends upon the type of interference. An adjustment time of 0.1 second out of every 10 seconds should suffice for some cases of RFI. In the case of a communication receiver, the open time of switch 45 may be as much as 99 percent. The variable delay and variable gain circuits are continually adjusted during the times when the radar echo or a radio communication system transmission is absent.

Although the foregoing embodiments employ essentially analog type circuits, as those skilled in the art recognize still other embodiments may employ equivalent digital circuit elements to accomplish those functions. As example, a still additional embodiment of the invention is illustrated in FIG. 5 to which reference is made. This embodiment uses an analog-to-digital converter 55 to convert the analog signal from IF amplifier 25 to digital values or numbers, a Fourier transformer 56 which parses the numbers amongst the various ranges of digital data representing increments of the frequency range, and a digital processor represented in dash lines 58.

The digital system of FIG. 5 may be compared with the analog system of FIG. 1. Both systems are identical in structure up through the IF Amplifier 25. Corresponding elements of FIG. 5 perform the same functions as in FIG. 1, but digital numbers rather than analog signals are used for the processing. For example, the subtractor circuit 27x of FIG. 1 is just a subtraction of two numbers in a computer as indicated by 57x in FIG. 5. The Adder 63 sums several weighted numbers to produce the composite output signal, which in this embodiment is represented by a number or a series of numbers. The weighting for each channel is accomplished by the multipliers 61. The delays represented by 59 and 60 are more easily accomplished in the digital domain than the analog. Delay 59 is adjustable to the same end as in the preceding analog embodiments by a feedback control loop, not illustrated. When RFI is being received and in the absence of the radar echo, the digital control loop checks the output of subtract circuit 57 and adjusts the delay until the difference being outputted is at a minimum. These digital processes are well known by one experienced in radar and digital signal processing, and more detailed descriptions are not necessary. The elimination of RFI is functionally the same for the digital system as for the analog system.

There are many ways to implement a digital system. FIG. 5 illustrates the principle and represents one implementation. The Fourier transformer divides the echo spectrum into the individual bands that are needed such as F1, F2, F3, . . . Fx. The signals in these bands are digitally detected by the transformer 56 so that subsequent phase adjustment is not needed as for FIGS. 1 and 3. The subtraction circuits 57x perform amplitude subtraction only. When there is no RFI in a channel, such as the F2 channel in FIG. 5, there is no need for subtraction. The blocks 64 are labels showing the frequency channels. Outputs 65 of the adjustment circuits may be used elsewhere in the processor. This is indicated by the arrows 66.

The preceding description was for signal subtractions that occur at the IF, intermediate frequency, stage, which was illustrated in FIGS. 1 and 3. For subtractions at IF, both the phase and amplitude of the correcting signal must be proper; that is, they must match the phase and amplitude of the RFI component of the IF signal to be subtracted. Another arrangement, illustrated in FIGS. 6a through 6c, involves a subtraction of detected signals which involve amplitude only. For this latter arrangement, the phase is nonexistent and the subtraction process is less complex. There may be only one frequency channel instead of the plurality of frequency channels as was used in the embodiment of FIG. 1. Such arrangement, however, has an inherent disadvantage. The phase information is lost, which, in turn, means that Doppler shifts of the target or parts of the target cannot be measured. Further, the target cannot be imaged. It remains possible to measure target velocity, however, by noting the change in range for successive received pulses. For some radars, such as a search radar, the arrangement illustrated by FIG. 6 would be useful and much simpler to implement that the embodiment of FIG. 1.

FIG. 6a shows an IF amplifier 10 followed by a detector 70. The output of detector 70 is a fluctuating direct current voltage. An example of this voltage is shown in the top trace 88 of FIG. 7a. A subtractor circuit, consisting of operational amplifier 87 and delay circuit 83, follows the detector 70 in FIG. 6a. The delay is set prior to operation and is equal in duration to the length of the received pulse plus the expected length of the largest target. The delay time in this arrangement is not as critical as for the IF subtraction case of FIG. 1. An example of the output of operational amplifier 87, which produces a difference signal, is shown as the lower trace 89 in FIG. 7a. The ideal output is illustrated by pulses 84 and 85 in FIG. 6a. The second pulse, 85, is either gated out, using conventional circuitry not illustrated, or is ignored by the operator. Occasionally during operation, a signal may appear such as at B in the bottom curve 89 of FIG. 7a that could be confused with the real echo. A verification pulse subsequently transmitted by the radar will serve to eliminate such spurious echoes.

A somewhat improved arrangement is shown as FIG. 6b, though a separate broad beam antenna and receiver are needed. In this case the RFI occurring at the time of pulse reception presented at detector 70' is subtracted at differential amplifier 72 from the output of detector 70 to produce output 81 which is illustrated by pulse 86. That output is also illustrated in FIG. 7b as trace 91. Trace 90 in FIG. 7b represents the output of the detector 70 in FIG. 6b.

The delays in the radar antenna channel and in the broad beam antenna channel must be set approximately equal at the time of construction, and there is no need for continual delay adjustment as for the cases of FIGS. 1 and 3. There is a need in most cases for a continual adjustment of the amplitude of the omnidirectional antenna signal. This adjustment occurs in the variable amplifier or attenuator 93, which in turn is controlled by the feedback circuit 92, which consists of a switch and sample, integrate, and hold circuits. Radar timing signals, obtained from the associated radar circuitry, not illustrated, controls the sampling time and sampling period. It also controls the resetting of the hold circuits. The sign of the voltage out of feedback circuit 92, positive or negative polarity, determines whether the gain of amplifier 93 is increased or decreased. This control is such as to force the voltage at 81 to be zero when no radar echo is present. When a radar echo could be present, the difference output 81 is not sampled by feedback circuit 92. A small amount of echo signal will be received by the broad beam antenna, but its power level will typically be 0.01 to 0.00001 as large as the echo signal received by the high gain radar antenna.

In a further alternative, the circuit arrangements of either FIG. 1 and FIG. 3 may be modified by replacing each channel with a circuit constructed in accordance with FIG. 6b, whereby the latter circuit is duplicated in number to equal the number of channels in those arrangements. In this case Doppler information is not lost and imaging is possible, and RFI elimination still occurs.

A somewhat better arrangement, one not requiring a separate antenna, is illustrated by FIG. 6c. This arrangement takes samples of the RFI just before and just after the arrival of the desired radar pulse. One half of each of these two samples is subtracted from the output of detector 70 to produce output 82 which is illustrated as pulses 76, 77, and 78. Pulses 77 and 78 are one half the amplitude of pulse 76 and are either time gated out or ignored by the operator. The advantage of this scheme is a more accurate sample of RFI at the time of pulse reception than that illustrated by FIG. 6a. In FIG. 6c note that a signal level equal one half the signal level occurring before the echo pulse plus one half the signal level occurring after the echo pulse is subtracted from the signal level at the time of the echo pulse. For this process the attenuator 74 reduces the subtract signals by one half, and delays 71 and 75 provide the needed delays. One experienced in the art will realize that these functions can be implemented either in analog fashion or in digital fashion.

As in the prior embodiments, a digital system can also be defined and made to perform the same functions analogous to and as illustrated by the circuits of FIGS. 6A, 6B and 6C, previously described. In such a digital system case, the Fourier transformer 56 and adder 63, found in the digital system of FIG. 5, are not needed, so there is just one broadband channel. Digital functions handle the processes as illustrated by FIGS. 6 which were previously described.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a system for transmitting and receiving pulsed RF signals, comprising a transmitter for radiating pulsed RF signals, a directional antenna, and a broad band receiver coupled to said directional antenna for receiving and processing pulsed RF signals of a given frequency in the possible presence of narrow band RFI signals created by a plurality of extraneous narrow band RFI sources, said narrow band RFI being distinct in frequency from one another and from said given frequency, whereby said receiver incidentally detects said RFI signals in addition to detecting pulsed wide band RF signals of said given frequency, the improvement for reducing the effect of said RFI signals, comprising:

separator means for parsing received signals amongst a plurality of separate and distinct frequency channels in dependence on the frequency of said signals and separately outputting each said channel, whereby a plurality of received RFI signals of different frequencies is produced at the respective channel outputs associated with such frequencies and wherein a received pulsed RF signal is divided into constituent spectral components and said constituent spectral components are individually output from respective channels associated with respective constituent spectral components;

counter signal generating means for producing a counter signal for each said channel; each said counter signal corresponding to at least a respective RFI signal in a respective one of said plurality of channels, each respective counter signal being of essentially the same amplitude as and phase with said associated respective RFI signal;

first combiner means, responsive to said separator means and to said counter signal generating means, for subtractively combining signals from each of said plurality of channels with the respective ones of said plurality of counter signals from said counter signal generating means to produce a corresponding plurality of difference signals, wherein each said RFI is effectively minimized and wherein the constituent components of a received pulsed RF signal are presented; and second combiner means, coupled to said first combiner means, for summing said plurality of difference signals to provide a composite output signal reproducing said pulsed RF signal.

2. The invention as defined in claim 1, wherein said counter signal generating means comprises:

a plurality of delay means, said plurality corresponding in number to said plurality of channels, and each of said delay means being associated with a corresponding one of said channels, each said delay means being connected to receive the output of the respective channel and output a delayed signal to a corresponding input of said first combiner means, whereby a delayed version of the RFI in the associated channel is supplied to said first combiner means.

3. The invention as defined in claim 1 wherein said counter signal generating means comprises:

Omnidirectional broad beam antenna means for receiving RFI signals propagating from virtually any direction to thereby duplicate RFI signals received by said receiver means;

second receiver means for receiving said RFI signals from said omnidirectional broad beam antenna means;

second separator means for parsing received signals amongst a plurality of separate and distinct frequency channels and separately outputting each said channel, whereby a plurality of received RFI signals falling within different frequency sub-ranges is produced at the respective channel outputs associated with such frequencies and wherein any received pulsed RF signal is divided into a plurality of constituent spectral components and parsed amongst said plurality of channels;

a plurality of delay means and amplitude adjustment means, with each of said delay means being serially connected with a corresponding one of said amplitude adjusting means, each of said delay means having an input connected to a respective output of a respective one of said channels defined by said second separator means; and each said amplitude adjustment means having a corresponding output to provide a plurality of outputs of said separator means.

4. The invention as defined in claim 1, wherein said separator means comprises: a plurality of tuned bandpass filters, each of said tuned bandpass filters having a defined bandwidth and a defined frequency range for selectively passing signals, said defined frequency ranges for said tuned bandpass filters being collectively equal to said predetermined frequency range of said receiver.

5. The invention as defined in claim 1, wherein said transmitter comprises a radar transmitter for transmitting pulsed RF signals, said receiver comprises a radar receiver for receiving radar echoes, and said pulsed RF signal comprises a radar echo.

6. The invention as defined in claim 2, wherein each said delay means includes phase shifting means.

7. The invention as defined in claim 6, wherein each said delay means is adjustable.

8. The invention as defined in claim 1 wherein said first combiner means comprises a plurality of combining circuit means, one associated with each said channel of said separator means, for subtractively combining signals from an associated channel with a respective one of said plurality of counter signals from said counter signal generating means, to produce a difference signal, each of said combining circuit means further comprising: differential amplifier means.

9. The invention as defined in claim 1, further comprising:

a plurality of gain controlled amplifier means, each of said gain controlled amplifier means being connected in circuit between a respective output of said first combiner means and an input of said second combiner means, and each said gain controlled amplifier means for regulating the average power level of signals inputted to said second combiner means.

10. The invention as defined in claim 7 further comprising:

a plurality of automatic adjustment means for adjusting the amount of delay of each of said plurality of delay means of said counter signal generating means to minimize the output of said first combiner means during the presence of RFI signals at said input to said first combiner means and said counter signal generating means during the absence of a pulse RF signal.

11. The invention as defined in claim 7 further comprising:

automatic adjustment means for adjusting the amount of delay of said counter signal generating means to minimize the output of said first combiner means during the presence of RFI signals at said input to said first combiner means and said counter signal generating means during the absence of a pulse RF signal, comprising:

sample and hold means;

switch means;

compare and logic circuit means for analyzing signal levels and for controlling said time delay means of said counter signal generating means;

said switch means being connected between the output of said first combiner means and said compare and logic circuit means;

said sample and hold means for closing said switch means during the absence of a pulsed RF signal at said receiver means to provide a sample of the difference signal from said first combiner means to said compare and logic circuit means;

said compare and logic circuit means determining from consecutive samples of said difference signal any change in the level of said difference signal and, responsive to determination of an increase in level, for adjusting said time delay of said counter signal generating means to produce a decrease in the level of said difference signal, whereby the amount of RFI that can pass through said first combiner means is minimized.

12. The invention as defined in claim 7 further comprising:

a plurality of automatic adjustment means for adjusting the amount of delay of each of said plurality of delay means of said counter signal generating means to minimize the output of said first combiner means during the presence of RFI signals at said input to said first combiner means and said counter signal generating means during the absence of a pulse RF signal, each of said plurality of automatic adjusting means, comprising:

sample and hold means;
switch means;
compare and logic circuit means for analyzing signal levels and for controlling said time delay means of said counter signal generating means;

said switch means being connected between the output of said first combiner means and said compare and logic circuit means;

said sample and hold means for closing said switch means during the absence of a pulsed RF signal at said receiver means to provide a sample of the difference signal from said first combiner means to said compare and logic circuit means;

said compare and logic circuit means determining from consecutive samples of said difference signal any change in the level of said difference signal and, responsive to determination of an increase in level, for adjusting said time delay of said counter signal generating means to produce a decrease in the level of said difference signal, whereby the amount of RFI that can pass through said first combiner means is minimized.

13. The invention as defined in claim 3, wherein each said delay means is adjustable.

14. The invention as defined in claim 13, wherein each said delay means comprises an adjustable phase adjustment circuit and and adjustable gain control circuit in series circuit.

15. The invention as defined in claim 14 further comprising:

a plurality of automatic adjustment means for adjusting the amount of delay of each of said plurality of delay means of said counter signal generating means to minimize the output of said first combiner means during the presence of RFI signals at said input to said first combiner means during the absence of a pulsed RF signal.

16. The invention as defined in claim 13, further comprising:

a plurality of automatic adjustment means for adjusting the amount of delay of each of said plurality of delay means of said counter signal generating means to minimize the output of said first combiner means during the presence of RFI signals at said input to said first combiner means during the absence of a pulse RF signal, each of said plurality of automatic adjusting means, comprising:

sample and hold means;
switch means;
compare and logic circuit means for analyzing signal levels and for controlling said time delay means of said counter signal generating means;

said switch means being connected between the output of said first combiner means and said compare and logic circuit means;

said sample and hold means for closing said switch means during the absence of a pulsed RF signal at said receiver means to provide a sample of the difference signal from said first combiner means to said compare and logic circuit means;

said compare and logic circuit means determining from consecutive samples of said difference signal any change in the level of said difference signal and, responsive to determination of an increase in level, for adjusting said time delay of said counter signal generating means and for adjusting said gain to produce a decrease in the level of said difference signal, whereby the amount of RFI that can pass through said first combiner means is minimized; and chopper means for alternately coupling the output of said compare and logic circuit means to said phase adjustment circuit and said gain adjustment circuit.

17. The invention as defined in claim 1, wherein said separator means comprises:

an analog to digital converter for converting signals into digital form;

a Fourier transformer responsive to said converter for digitally processing said signal and parsing said digitally processed signal into separate digital channels, each said channel defining a separate frequency range; and wherein each of said first combiner means, counter signal generating means and said second combiner means comprises, respectively, a digital first combiner means, a digital counter signal generating means and a digital second combiner means.

18. The invention as defined in claim 17, further comprising:

feedback control loop for adjusting said digital counter signal generating means.

19. The method of preventing a plurality of spurious RF sources of different frequencies from producing interference with the detection and processing of desired radar echoes in a wide band pulse radar receiving system capable of receiving such different frequencies, comprising the steps of:

separating received signals collectively representing spurious interference signals and the desired radar echo into a plurality of frequency sub-ranges, whereby each spurious signal falls into a respective one of said sub-ranges to produce a separate plurality of spurious signals of individual amplitude and phase together with a component of any desired radar echo that is simultaneously received;

generating a counter signal for each separate spurious signal, each said counter signal being equal in amplitude and phase with the amplitude and phase determined from the spurious signal within each respective subrange;

subtracting each counter signal from the corresponding spurious signal plus said desired echo component in each said subrange to produce a corresponding difference signal that is essentially a component of the desired radar echo;

combining all said difference signals to produce a combined signal in which any interference signals have been minimized, whereby the combined signal represents essentially the desired radar echo.

20. The method as defined in claim 19, wherein the step of generating a counter signal for each spurious signal includes the step of delaying a portion of the spurious signal that is received during the absence of said desired radar echo.

21. The method as defined in claim 19, wherein the step of generating a counter signal for each spurious signal includes the steps of:

simultaneously separately receiving said spurious interference signals to provide a second source of said spurious interference signals;

separating received signals from said second source into a plurality of frequency sub-ranges corresponding to the sub-ranges of said first source, whereby each spurious signal falls into a respective one of said subranges to produce a separate plurality of spurious signals of individual amplitude and phase;

adjusting the amplitude and phase of each spurious signal from said second source in each subrange to match the amplitude and phase of spurious signals to generate the counter signal for each subrange.

22. The method as defined in claim 21, wherein the step of adjusting the amplitude and phase of each spurious signal from said second source in each subrange to match the amplitude and phase of spurious signals to generate the counter signal for each subrange, includes the steps of:

determining whether a radar echo is being received; and continuously adjusting the amplitude and phase only during the periods in which a radar echo is not being received.

23. A radar system for transmitting and receiving a train of pulsed RF signals, whereby a reflecting surface on which said pulsed RF signals is incident reflects echoes thereof to said radar system, said radar system comprising a transmitter, directional antenna, receiver, said receiver receiving from said directional antenna and detecting a total signal occuring within a predefined pass band comprising an echo of a transmitted RF pulse signal and any RFI present within said pass band, and a signal processor for receiving and processing RF echoes during the presence of RFI, said signal processor including circuit means for reducing the effect of said RFI in the received detected signal, comprising:

means for determining the amplitude of the detected RFI existing at the time of echo reception; and means for subtracting the amplitude of said detected RFI from the amplitude of the total detected signal to produce a difference signal representative of the desired echo, whereby said RFI is substantially eliminated.

24. The invention as defined in claim 23, wherein said means for determining the amplitude of the detected RFI at the time of echo reception comprises:

means for sampling and averaging the RFI occuring during a first short time interval prior to reception of a desired echo signal and a second short time interval subsequent to reception of said desired echo signal; and delay means for delaying the sampled signals for a third predetermined time interval equal to the time between the completion of said sampling to the next reception of RFI that follows shortly the next received echo.

25. The invention as defined in claim 23, wherein said means for subtracting the amplitude of said detected RFI from the amplitude of the total detected signal to produce a difference signal representative of the desired echo, comprises: differential amplifier means.

26. The invention as defined in claim 23, wherein said means for determining the amplitude of the detected RFI existing at the time of echo reception, comprises:

broad beam antenna means for receiving RFI separately from any RFI received with said echo at said directional antenna means; and means for adjusting the level of RFI received at said broad beam antenna to be equal to that received at said directional antenna.

* * * * *